US012046793B2

(12) United States Patent
Watanabe et al.

(10) Patent No.: US 12,046,793 B2
(45) Date of Patent: Jul. 23, 2024

(54) CONNECTION STRUCTURE OF WAVEGUIDE, WAVEGUIDE CONNECTOR, MODE CONVERTER, AND WAVEGUIDE UNIT

(71) Applicants: OLYMPUS CORPORATION, Hachioji (JP); FUKUI PREFECTURAL GOVERNMENT, Fukui (JP)

(72) Inventors: Tadashi Watanabe, Nagano (JP); Shinji Suesada, Fukui (JP)

(73) Assignees: OLYMPUS CORPORATION, Tokyo (JP); FUKUI PREFECTURAL GOVERNMENT, Fukui (JP)

( * ) Notice: Subject to any disclaimer, the term of this patent is extended or adjusted under 35 U.S.C. 154(b) by 274 days.

(21) Appl. No.: 17/824,034

(22) Filed: May 25, 2022

(65) Prior Publication Data

US 2022/0285815 A1 Sep. 8, 2022

Related U.S. Application Data

(63) Continuation of application No. PCT/JP2020/037991, filed on Oct. 7, 2020.

(30) Foreign Application Priority Data

Dec. 24, 2019 (JP) ................................ 2019-233391

(51) Int. Cl.
*H01P 5/08* (2006.01)
*H01P 3/12* (2006.01)
*H01P 3/16* (2006.01)

(52) U.S. Cl.
CPC ................. *H01P 5/08* (2013.01); *H01P 3/12* (2013.01); *H01P 3/16* (2013.01)

(58) Field of Classification Search
CPC ...... H01P 5/08; H01P 5/00; H01P 5/02; H01P 5/022; H01P 5/1022; H01P 5/087;
(Continued)

(56) References Cited

U.S. PATENT DOCUMENTS 9,628,143 B2 4/2017 Okada
10,283,833 B2 5/2019 Okada
(Continued)

FOREIGN PATENT DOCUMENTS

EP 1289048 A2 3/2003
EP 2290740 A1 3/2011
(Continued)

OTHER PUBLICATIONS

International Search Report (ISR) (and English language translation thereof) dated Dec. 22, 2020, issued in International Application No. PCT/JP2020/037991.

*Primary Examiner* — Stephen E. Jones
(74) *Attorney, Agent, or Firm* — Holtz, Holtz & Volek PC

(57) ABSTRACT

A connection structure of a waveguide includes a rod-like dielectric, and an outer conductor. A three-dimensional component includes a connection surface, an insertion hole, and a corner which forms an opening edge of the insertion hole over an entire circumference on the connection surface, the connection surface at least partially including a conductive region to which a connection enlarged portion of the outer conductor is connected, the insertion hole having conductivity over an entire circumference of an inner surface, the corner having conductivity and being conducted with the inner surface of the insertion hole. In a state where the waveguide and the three-dimensional component are connected with each other, the connection enlarged portion is electrically conducted with the inner surface of the insertion hole through electrical connection with the con-
(Continued)

nection surface and the corner, and smooth connection is made at the corner.

15 Claims, 20 Drawing Sheets

(58) Field of Classification Search
CPC .... H01P 3/12; H01P 3/16; H01P 3/122; H01P 1/00; H01P 1/04
See application file for complete search history.

(56) References Cited

U.S. PATENT DOCUMENTS

| | | | | |
|---|---|---|---|---|
| 11,476,554 | B2 * | 10/2022 | Dogiamis | H01P 5/087 |
| 2003/0030503 | A1 | 2/2003 | Paynter et al. | |
| 2011/0047588 | A1 | 2/2011 | Takeuchi et al. | |
| 2016/0126611 | A1 | 5/2016 | Erskine et al. | |
| 2016/0308266 | A1 * | 10/2016 | Hammerschmidt | G02B 1/045 |
| 2019/0190105 | A1 * | 6/2019 | Ishizuka | F16L 23/032 |
| 2020/0060513 | A1 | 2/2020 | Ito et al. | |
| 2022/0046205 | A1 | 2/2022 | Watanabe | |

FOREIGN PATENT DOCUMENTS

| | | | |
|---|---|---|---|
| JP | S54146144 | U | 10/1979 |
| JP | S60006302 | U | 1/1985 |
| JP | H08195605 | A | 7/1996 |
| JP | 2003110313 | A | 4/2003 |
| JP | 2008193481 | A | 8/2008 |
| JP | 2011044953 | A | 3/2011 |
| JP | 2015185858 | A | 10/2015 |
| JP | 2015226129 | A | 12/2015 |
| JP | 2017046344 | A | 3/2017 |
| JP | 2017147548 | A | 8/2017 |
| JP | 2017147551 | A | 8/2017 |
| JP | 6343827 | B2 | 6/2018 |
| JP | 2018099172 | A | 6/2018 |
| WO | 2014162833 | A1 | 10/2014 |
| WO | 2014188218 | A1 | 11/2014 |

* cited by examiner

FIG. 12

| SHAPE OF DISTAL END OF DIELECTRIC | MEASUREMENT RESULT (MAGNITUDE OF REFLECTION) |
|---|---|
| COMPARISON EXAMPLE | −16.2 dB |
| CONFIGURATION EXAMPLE A | −28.4 dB |
| CONFIGURATION EXAMPLE B | −35.2 dB |
| CONFIGURATION EXAMPLE C | −35.2 dB |
| CONFIGURATION EXAMPLE D | −34.2 dB |
| CONFIGURATION EXAMPLE E | −42.3 dB |

CONNECTION STRUCTURE OF WAVEGUIDE, WAVEGUIDE CONNECTOR, MODE CONVERTER, AND WAVEGUIDE UNIT

CROSS REFERENCE TO RELATED APPLICATION

This application is a continuation application of PCT/JP2020/037991 filed on Oct. 7, 2020 and claims benefit of Japanese Application No. 2019-233391 filed in Japan on Dec. 24, 2019, the entire contents of which are incorporated herein by this reference.

BACKGROUND OF THE INVENTION

1. Field of the Invention

The present invention relates to a connection structure of a waveguide, a waveguide connector, a mode converter, and a waveguide unit, and particularly to a connection structure of a waveguide including an outer conductor having a braid shape, a waveguide connector, a mode converter, and a waveguide unit.

2. Description of the Related Art

In recent years, in various fields including the field of broadcasting, an effort has been widely made to achieve high definition video, such as 4K/8K images. High definition video, such as 4K/8K images, has a large video information volume due to the increase in the number of pixels and hence, a communication speed of several tens of Gbps or more is required.

Transmission methods which use metal wires have been conventionally widely used for short-distance information transmission. More specifically, transmission methods which use a coaxial line, a twisted pair line, a twinax line or the like have been conventionally widely used for short-distance information transmission. However, such methods have difficulty in dealing with a communication speed of several tens of Gbps or more.

Optical communication technology has been conventionally used for long-distance transmission or high speed communication in data centers, and the optical communication technology can be considered for use to transmit large-volume information, such as high definition video. However, transmission/reception units used for optical communication are extremely expensive and hence, there is an economical problem that it is particularly difficult to adopt a product at a general price as communication means for short-distance information communication.

Further, the transmission/reception unit for optical communication requires connection technology with a high accuracy in the line connection on the order of approximately several μm, and the mere adhesion of fine dust or dirt to a connection surface may cause a disconnection of communication. Therefore, the transmission/reception unit for optical communication has a problem that it is difficult to ensure reliability, particularly in a product in which connections are performed repeatedly. In other words, it is difficult to use optical communication technology as an alternative to transmission methods using metal wires, which has been conventionally used for short-range communication.

In view of such circumstances, the development of a communication method, which performs high speed communication with millimeter wave by using a flexible waveguide, has advanced as wired communication means which can achieve high speed communication at several tens of Gbps or more, inexpensiveness, and connection reliability at a high level.

For example, Japanese Patent Application Laid-Open Publication No. 2017-147548 proposes a flexible waveguide including a hollow first cylindrical dielectric, a cylindrical conductor disposed on the outer periphery of the first cylindrical dielectric, and a second cylindrical dielectric disposed on the outer periphery of the cylindrical conductor.

International Publication No. 2014/162833 proposes a flexible waveguide including a hollow cylindrical dielectric, metal plating layers which cover two surfaces where the electric field intersects, and a protective layer which covers the periphery of the dielectric including the two surfaces covered by the metal plating layers.

Further, Japanese Patent No. 6343827 proposes a flexible waveguide where a rod-like dielectric is disposed at the center, and an outer conductor, which is obtained by braiding flat foil yarns into a braid shape, is disposed on the outer surface of the dielectric.

SUMMARY OF THE INVENTION

One aspect of the present invention is directed to a connection structure of a waveguide, the connection structure connecting a waveguide used for transmitting a radio wave of a millimeter wave frequency or a frequency higher than the millimeter wave frequency, to another member, wherein the waveguide includes a rod-like dielectric, and an outer conductor formed by braiding a plurality of flat foil yarns into a braid shape around the rod-like dielectric, the plurality of flat foil yarns having conductivity, a three-dimensional component, which is the other member, includes a connection surface at least partially including a conductive region to which a connection enlarged portion of the outer conductor is connected in a state where the three-dimensional component is connected with the waveguide, an insertion hole which is open on the connection surface, and has conductivity over an entire circumference of an inner surface, a portion of the rod-like dielectric exposed at the connection enlarged portion of the waveguide being inserted into the insertion hole in the state where the three-dimensional component is connected with the waveguide, and a corner which forms an opening edge of the insertion hole over an entire circumference on the connection surface, the corner having conductivity and being conducted with the inner surface of the insertion hole, and in a state where the waveguide and the other member are connected with each other, the connection enlarged portion is electrically conducted with the inner surface of the insertion hole through electrical connection with the connection surface and the corner, and smooth connection is made at the corner.

The meaning of "smooth connection is made at the corner" will be described. A waveguide path is achieved in such a manner that electromagnetic waves propagate through a conduit having a conductive inner wall while being confined by the inner wall of the conduit. In the present invention, "smooth connection is made at the corner" means a connection at a corner in a mode where the inner surface of the outer conductor of the waveguide (a waveguide path formed by the inner surface of the outer conductor of the waveguide) and the inner surface of the insertion hole (a waveguide path formed by the inner surface of the insertion hole) are continuously connected to be aligned within an error range of 1/50 of a center wavelength λ of a carrier wave. When the waveguide path on the waveguide side and the waveguide path on the three-dimensional component side are continuous within such an error range, reflection at an end point at the boundary between the waveguide paths can be sufficiently suppressed to a level which causes no problem with little signal loss.

More specifically, it is sufficient that, the inner surface of the outer conductor of the waveguide is continuous with the inner surface of insertion hole at the corner without having a stepped portion or a groove which exceeds the above-mentioned error range at a connection boundary.

A waveguide connector of another aspect of the present invention has the connection structure of the waveguide.

A mode converter of another aspect of the present invention has the connection structure of the waveguide.

A waveguide unit of another aspect of the present invention includes a waveguide and the waveguide connectors, the waveguide including a rod-like dielectric having a flat cross-sectional shape and an outer conductor formed by braiding a plurality of flat foil yarns into a braid shape around the rod-like dielectric in a longitudinal direction, the plurality of flat foil yarns having conductivity, the waveguide connectors being disposed at both ends of the waveguide, each of the waveguide connectors being connectable to a hollow square waveguide.

BRIEF DESCRIPTION OF THE DRAWINGS

FIG. 12 is a view showing the measurement results obtained by experimentally continuing the shapes of the distal ends of the dielectrics and amounts of reflection generated;

DETAILED DESCRIPTION OF THE PREFERRED EMBODIMENTS

Hereinafter, embodiments of the present invention will be described with reference to drawings.

Note that the drawings are schematic views, and relationships between thicknesses and widths of the respective members, and ratios between the respective members, for example, may differ from actual ones. The dimensions and the ratio may be partially different between drawings.

First Embodiment

Figure 1A:
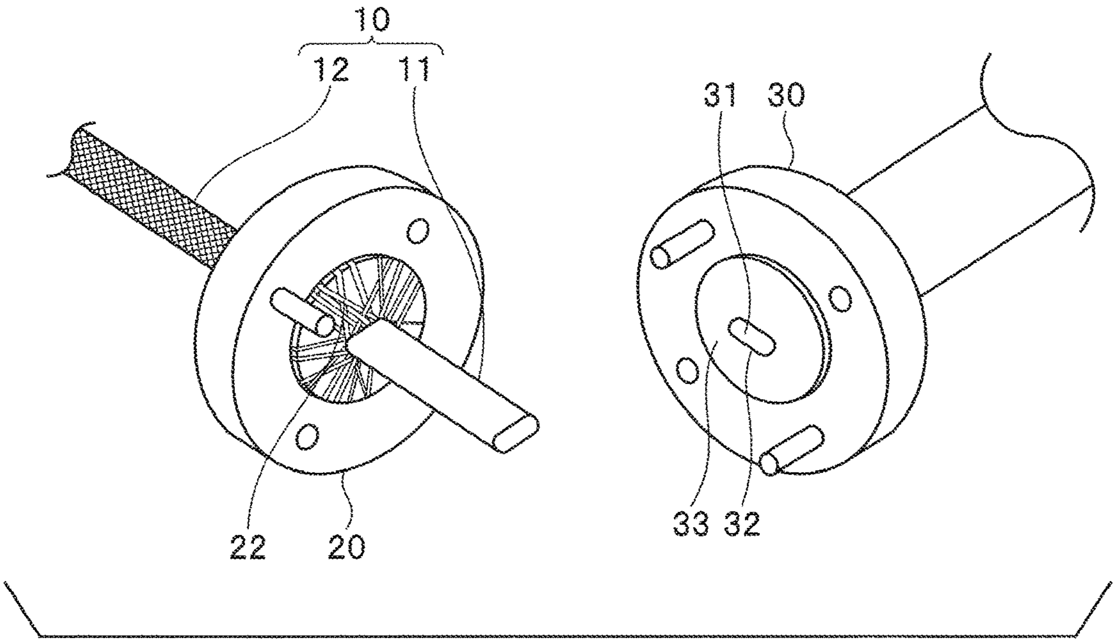
FIG. 1A is an external appearance view showing external appearances of a flexible waveguide used for transmitting radio waves in a millimeter wave band, a fixing member, and a three-dimensional component, and showing a state where an end portion of the flexible waveguide is combined with the fixing member.
Figure 1B:
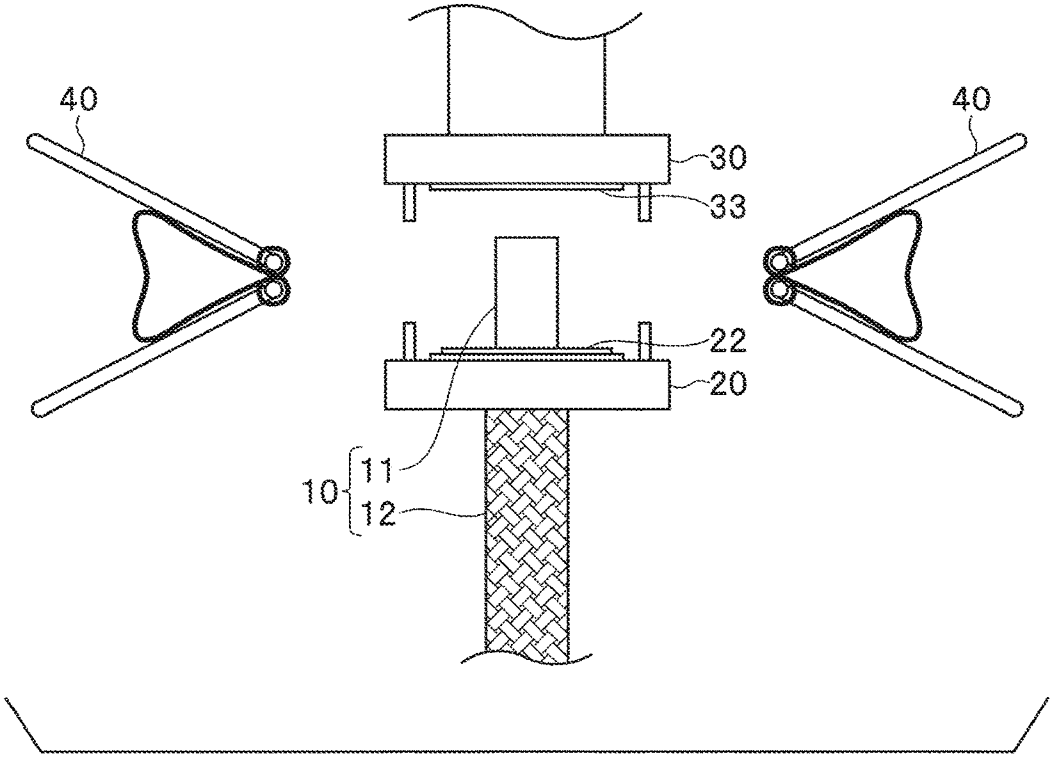
FIG. 1B is an external appearance view showing the external appearances of the flexible waveguide, the fixing member, the three-dimensional component, and auxiliary pressing members.
Figure 1C:
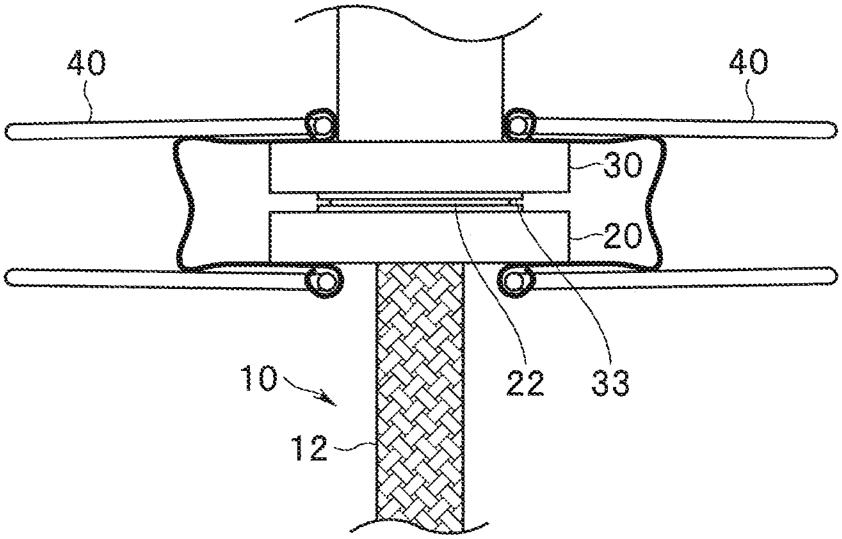
FIG. 1C is an external appearance view showing an assembled state where the flexible waveguide, the fixing member, the three-dimensional component, and the auxiliary pressing members are combined with each other.

First, a configuration of a connection structure of a waveguide according to a first embodiment will be described with reference to FIG. 1 to FIG. 4. FIG. 1A is an external appearance view showing external appearances of a flexible waveguide used for transmitting radio waves in a millimeter wave band, a fixing member, and a three-dimensional component, and showing a state where an end portion of the flexible waveguide is combined with the fixing member. FIG. 1B is an external appearance view showing the external appearances of the flexible waveguide, the fixing member, the three-dimensional component, and auxiliary pressing members. FIG. 1C is an external appearance view showing an assembled state where the flexible waveguide, the fixing member, the three-dimensional component, and the auxiliary pressing members are combined with each other.

Figure 2A:
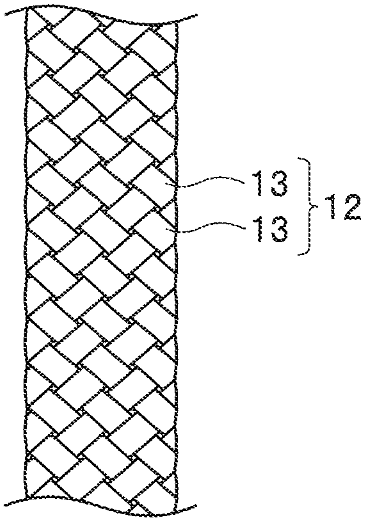
FIG. 2A is an external appearance view showing the external appearance of an outer conductor of the flexible waveguide, the outer conductor being formed by braiding flat foil yarns into a braid shape.
Figure 2B:
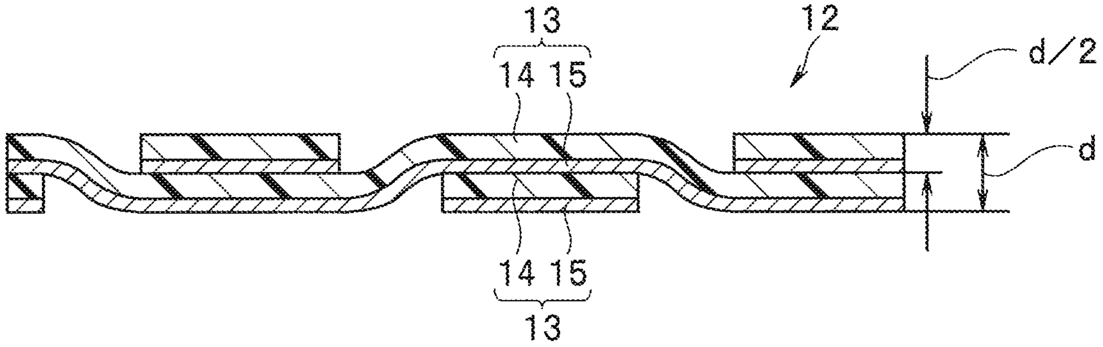
FIG. 2B is a cross-sectional view showing a cross section of the outer conductor formed by braiding the flat foil yarns into the braid shape.
Figure 3:
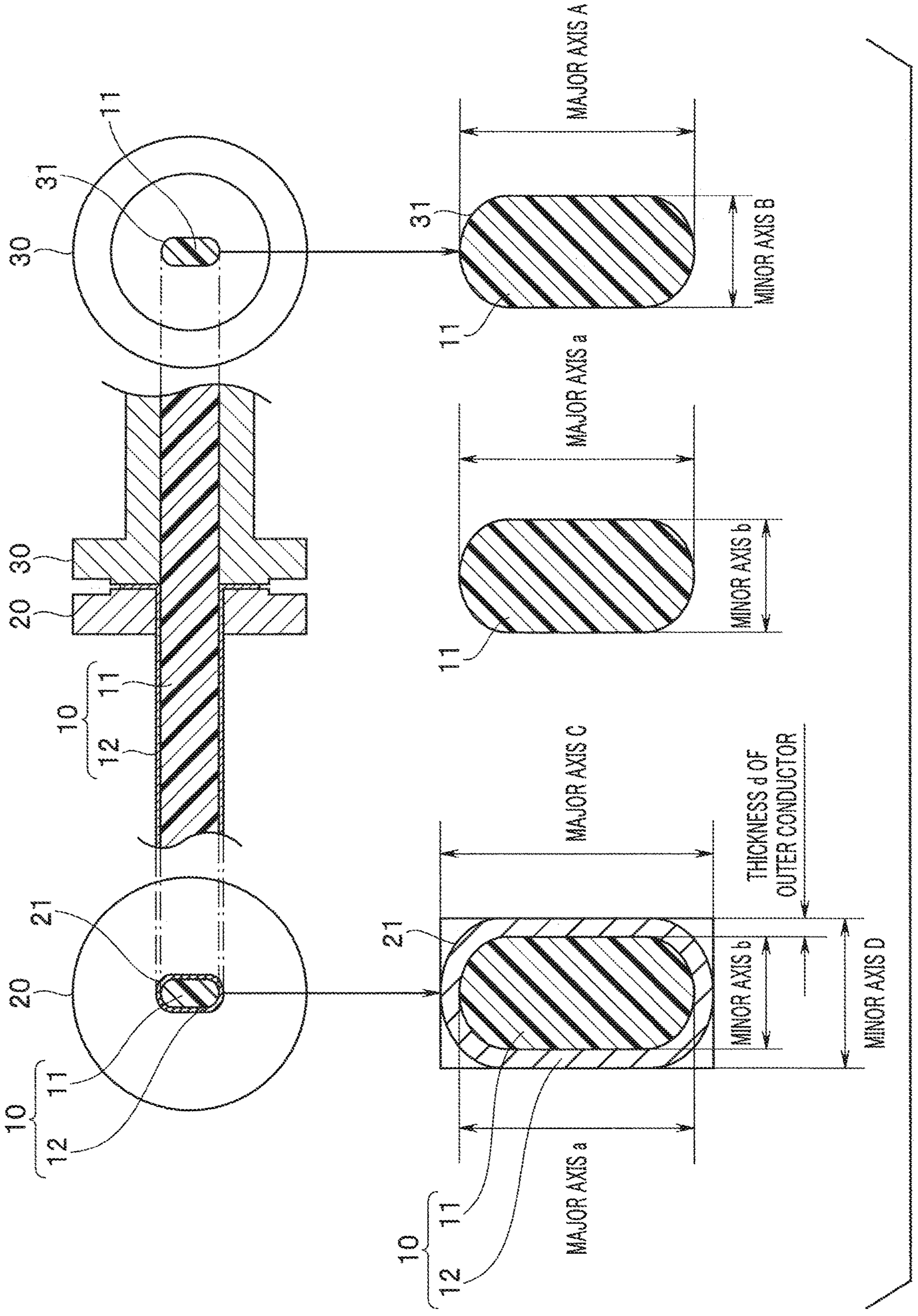
FIG. 3 is a cross-sectional view showing cross sections of the flexible waveguide, the fixing member, and the three-dimensional component in a combined state.
Figure 4:
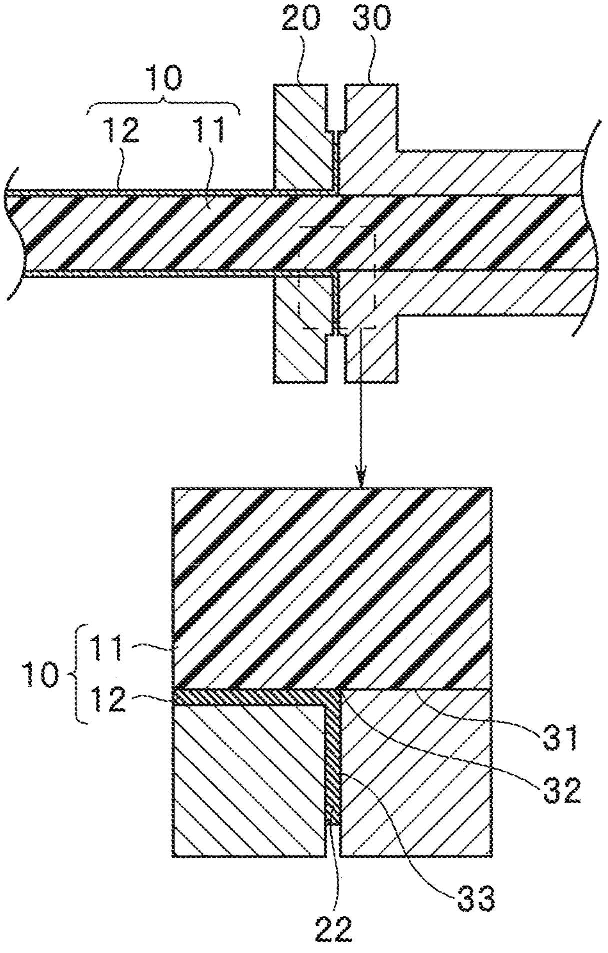
FIG. 4 is a cross-sectional view showing an enlarged cross section of a connection portion of the flexible waveguide, the fixing member, and the three-dimensional component in the combined state.

FIG. 2A is an external appearance view showing an external appearance of an outer conductor of the flexible waveguide, the outer conductor being formed by braiding flat foil yarns into a braid shape. FIG. 2B is a cross-sectional view showing a cross section of the outer conductor formed by braiding the flat foil yarns into the braid shape. FIG. 3 is a cross-sectional view showing cross sections of the flexible waveguide, the fixing member, and the three-dimensional component in a combined state. FIG. 4 is a cross-sectional view showing an enlarged cross section of a connection portion of the flexible waveguide, the fixing member, and the three-dimensional component in the combined state.

As shown in FIG. 1A, FIG. 1B and FIG. 1C, the connection structure of the waveguide is configured of a flexible waveguide 10 having flexibility, a fixing member 20 disposed at an end portion of the flexible waveguide 10, a three-dimensional component 30 to which the end portion of the flexible waveguide 10 is connected, and auxiliary pressing members 40 that press the fixing member 20 and the three-dimensional component 30 together. The connection structure of the waveguide of the present embodiment is described by taking the flexible waveguide 10 having flexibility as an example. However, the waveguide is not limited to a waveguide having flexibility. It is also possible to use a waveguide made of another material, such as a semi-flexible waveguide or a rigid waveguide, provided that the waveguide includes an outer conductor having a braid shape.

The flexible waveguide 10 is configured of a dielectric 11 having flexibility and an outer conductor 12. The dielectric 11 is formed into a rod shape having a flat cross-sectional shape with a major axis "a" and a minor axis "b". The outer conductor 12 is provided around the dielectric 11.

As shown in FIG. 2A and FIG. 2B, the outer conductor 12 is formed by braiding a plurality of flat foil yarns 13 around the dielectric 11 into a braid shape in the longitudinal direction, the plurality of flat foil yarns 13 having conductivity. More specifically, the outer conductor 12 is wound around an outer peripheral surface of the dielectric 11, and the flat foil yarns 13 are knitted to form a braid structure.

The strip-shaped flat foil yarn 13 has a rectangular shape in cross section perpendicular to the longitudinal direction, and has a structure where a resin film 14 containing non-metallic substances and a metal foil 15 containing metallic substances are laminated together. When the thickness of one flat foil yarn 13 forming the braid structure is taken as d/2, the thickness of the outer conductor 12 is "d", being two times the thickness d/2.

The flat foil yarns 13 are arranged and braided into a braid shape such that the metal foil 15 side (the lower side in FIG. 2B) of each flat foil yarn 13 forms the inner side of the outer conductor 12 forming the flexible waveguide 10. In other words, the flat foil yarns 13 are arranged such that the metal foil 15 side of the outer conductor 12 comes into contact with the outer side of the dielectric 11.

The fixing member 20 is a metal component made of brass or the like, and has a through hole 21 into which the flexible waveguide 10 is inserted. The end portion of the flexible waveguide 10 is inserted into the through hole 21 of the fixing member 20 together with the outer conductor 12. An end portion of the outer conductor 12 is pushed and expanded against the fixing member 20 while maintaining the braid structure, thus forming a connection enlarged portion 22. The through hole 21 formed in the fixing member 20 has a flat cross section with a major axis "C" and a minor axis "D".

The three-dimensional component 30 is a metal component made of brass or the like, and includes an insertion hole 31 that allows insertion of the dielectric 11, a corner portion 32 forming an insertion end of the insertion hole 31, and a connection surface 33 disposed adjacent to the corner portion 32. The insertion hole 31 formed in the three-dimensional component 30 has a flat cross section with a major axis "A" and a minor axis "B" at the corner portion 32, which is the insertion end. The three-dimensional component 30 is formed of a metal component and hence, an inner surface of the insertion hole 31, the corner portion 32, and the connection surface 33 have conductivity, and are electrically connected with each other. The three-dimensional component 30 is not limited to a metal component, and may be a molded interconnect device (MID) where a metal film is formed on the surface of a resin molded product.

The auxiliary pressing members 40 may be binder clips, for example. In the present embodiment, the fixing member 20 and the three-dimensional component 30 are sandwiched and pressed together by using two binder clips. It is unnecessary for the binder clips to have a special structure, and it may be sufficient to use commercially available binder clips, for example. Binder clips are used as an example of the auxiliary pressing members 40. However, the auxiliary pressing members 40 are not limited to the binder clips. A function substantially equal to the function of the binder clips may be achieved by using screws, an elastic member made of rubber or the like, or a pressure-sensitive adhesive, for example.

The dielectric 11 at the end portion of the flexible waveguide 10 is inserted into the insertion hole 31 of the three-dimensional component 30. The connection enlarged portion 22 is sandwiched and fixed between the connection surface 33 of the three-dimensional component 30 and the fixing member 20.

The major axis "a" and the minor axis "b" of the dielectric 11 are respectively substantially equal to the major axis "A" and the minor axis "B" of the insertion hole 31 of the three-dimensional component 30. Therefore, the position of the end portion of the flexible waveguide 10 is uniquely determined.

The connection enlarged portion 22 is formed of the end portion of the outer conductor 12, and is sandwiched and fixed between the connection surface 33 of the three-dimensional component 30 and the fixing member 20. The connection enlarged portion 22 expands the braid-shaped configuration along the connection surface 33 from the corner portion 32 of the three-dimensional component 30, and is fixed in a state where the braid-shaped configuration is expanded. At this point of operation, the connection enlarged portion 22 is pressed between the fixing member 20 and the three-dimensional component 30 by the auxiliary pressing members 40.

Here, the major axis "C" of the flattened through hole 21 of the fixing member 20 is a major axis obtained by adding the value of two times the thickness "d" of the outer conductor 12 to the major axis "a" of the cross section of the dielectric 11, and the minor axis "D" of the flattened through hole 21 of the fixing member 20 is a minor axis obtained by adding the value of two times the thickness "d" of the outer conductor 12 to the minor axis "b" of the cross section of the dielectric 11.

Next, operation of the connection structure of the flexible waveguide having such a configuration will be described.

In the configuration of the present embodiment, the entire inner surface of the insertion hole 31 formed in the three-dimensional component 30 has conductivity, and the entire connection surface 33 starting from the corner portion 32 has conductivity. Therefore, the insertion hole 31 can serve as a waveguide, thus transmitting radio waves.

Further, as shown in FIG. 2A and FIG. 2B, the outer conductor 12 having the braid structure functions and hence, the flexible waveguide 10 transmits radio waves into the inside. In other words, both the insertion hole 31 of the three-dimensional component 30 and the flexible waveguide 10 transmit radio waves, and are connected at the corner portion 32.

When the major axis and the minor axis of the dielectric 11 are taken as "a" and "b", the major axis and the minor axis of the insertion hole 31 formed in the three-dimensional component 30 are taken as "A" and "B", the major axis and the minor axis of the through hole 21 formed in the fixing member 20 are taken as "C" and "D", and the thickness of the outer conductor 12 is taken as "d", "A", "B", "C", and "D" in the present embodiment are set as follows by using dimensions "a" and "b" of the flexible rod-like dielectric as the reference.

The major axis "A" of the insertion hole 31 of the three-dimensional component 30 is substantially equal to the major axis "a" of the dielectric 11.

The minor axis "B" of the insertion hole 31 of the three-dimensional component 30 is substantially equal to the minor axis "b" of the dielectric 11.

The major axis "C" of the through hole 21 of the fixing member 20 is substantially equal to a length (a+2d), which is a value obtained by adding the value of two times the thickness "d" of the outer conductor 12 to the major axis "a" of the dielectric 11.

The minor axis "D" of the through hole 21 of the fixing member 20 is substantially equal to a length (b+2d), which is a value obtained by adding the value of two times the thickness "d" of the outer conductor 12 to the minor axis "b" of the dielectric 11.

Here, the phrase "substantially equal" indicates dimension setting where the dielectric 11 can be inserted into the insertion hole 31 of the three-dimensional component 30 without backlash, and dimension setting where the flexible waveguide 10 can be inserted into the fixing member 20 without backlash.

When the respective dimensions are set based on such relationship, as shown in FIG. 3, the inner surface dimensions of the outer conductor 12 of the flexible waveguide match the inner dimensions of the corner portion 32, which is an end surface of the insertion hole 31 formed in the three-dimensional component 30. In other words, as described above, "the major axis "a" and the minor axis "b" of the dielectric 11 are substantially equal to the major axis "A" and the minor axis "B" of the insertion hole 31 and, therefore, the position of the end portion of the flexible waveguide 10 is uniquely determined". Further, the major axis "C" of the through hole 21 of the fixing member 20 is a dimension substantially equal to the diameter obtained by adding the value of two times the thickness "d" of the outer conductor 12 (2×d) to the major axis "a" of the dielectric 11, and the minor axis "D" of the through hole 21 of the fixing member 20 is a dimension substantially equal to the diameter obtained by adding the value of two times the thickness "d" of the outer conductor 12 (2×d) to the minor axis "b" of the dielectric 11. Accordingly, the outer conductor 12 can maintain the shape until the outer conductor 12 comes into contact with the corner portion 32 of the three-dimensional component 30, and can be connected to the corner portion 32 without forming a stepped portion at the connection portion. Therefore, as shown in FIG. 4, smooth connection of the connection enlarged portion 22 can be made at the corner portion 32 of the three-dimensional component 30 and hence, the formation of a stepped portion can be minimized in the connection at the corner portion 32 of the three-dimensional component 30. Reducing the size of the stepped portion to a small size is a requirement for suppressing loss (reflection) of radio waves at the connection portion of the waveguide. Particularly, by setting the size of the stepped portion to 1/50 or less of the wavelength of radio waves propagating through the flexible waveguide 10, it is possible to suppress loss (reflection) of radio waves at the connection portion of the waveguide.

As described above, the connection enlarged portion 22 is pressed between the connection surface 33 of the three-dimensional component 30 and the fixing member 20 by the auxiliary pressing members 40, thus being fixed. At this point of operation, the connection enlarged portion 22 expands the braid-shape structure along the connection surface 33 from the corner portion 32. The flat foil yarns 13 have the braid-shape structure, and the surface of each flat foil yarn 13 having the metal foil 15 is directed toward the connection surface 33. As a result, as shown in FIG. 4, metal (the metal foils 15) of the outer conductor 12 of the flexible waveguide 10 comes into contact with the connection surface 33 of the three-dimensional component 30 having conductivity within a range starting from the corner portion 32, so that electrical conduction between the connection enlarged portion 22 and the connection surface 33 can be made. This electrical conduction is a requirement for suppressing loss of radio waves (leakage of radio waves) at the connection portion.

The loss of radio waves is likely to be a problem particularly in radio waves in a millimeter wave frequency bands or bands higher than the millimeter wave frequency bands. This is because radio waves in the millimeter wave frequency bands or the bands higher than the millimeter wave frequency bands have a short wavelength and hence, even slight unevenness of the structure adversely affects the transmission of radio waves. More specifically, it is known that the influence of the structure (not limited to unevenness, and also including heterogeneity or the like of the medium) of a medium on waves, not limited to electromagnetic waves, can be suppressed to a sufficiently small level provided that the size of the structure falls within approximately 1/50 of the wavelength (see paragraphs [0094] to [0102] of Japanese Patent Application Laid-Open Publication No. 2018-99172, for example). For example, when transmission of millimeter radio waves of 60 GHz is considered, the wavelength of a radio wave of 60 GHz in a free space is 5 mm, and 1/50 of the wavelength is 0.1 mm. It is not easy to suppress the size of the stepped portion of the outer conductor 12 to 0.1 mm or less in the connection structure of the waveguide considered in the present invention. In contrast, according to the present invention, the size of the stepped portion of the outer conductor 12 can be easily suppressed to 0.1 mm or less and hence, it is possible to achieve smooth connection at the corner portion 32 described in the present invention.

The connection enlarged portion 22 and the connection surface 33 of the three-dimensional component 30 may be bonded by a conductive adhesive agent to achieve electrical conduction between the connection enlarged portion 22 and the connection surface 33 of the three-dimensional component 30. In this case, the connection structure of the flexible waveguide 10 may not include the fixing member 20 and the auxiliary pressing members 40. In other words, for example, by using the fixing member 20 and the auxiliary pressing members 40 at the time of performing a bonding work, it is possible to easily achieve electrical bonding while suppressing the formation of the stepped portion in the same manner as the case where the fixing member 20 and the auxiliary pressing members 40 are used, and it is possible to obtain an advantageous effect substantially equal to the advantageous effect obtained in the case where the fixing member 20 and the auxiliary pressing members 40 are used.

In the present embodiment, the through hole 21 of the fixing member 20 has the major axis "C" and minor axis "D" in all cross section of the through hole 21. However, substantially the same advantageous effect can be obtained provided that the through hole 21 has a portion having the smallest diameter of the through hole at least at a side end which comes into contact with the three-dimensional component 30, and the major axis and the minor axis of the cross section of such a through hole at the portion having the smallest diameter satisfy the above-mentioned conditions, that is, $C=a+2d$, $D=b+2d$.

As a result of the above, the connection structure of the flexible waveguide 10 of the present embodiment can prevent loss of radio waves (reflection and leakage of radio waves). Therefore, according to the present embodiment, it is possible to prevent loss of radio waves when the flexible waveguide is connected to another member, the flexible waveguide including the outer conductor having the braid-shape structure.

In the configuration of the present embodiment, the dimensions of the flattened insertion hole 31 of the three-dimensional component 30 are set to the dimensions of the cross sectional shape of the flattened dielectric 11 and hence, positioning can be made accurately whereby assembly can be performed easily.

Further, the outer conductor 12 braided into the braid shape is pushed and expanded to form the connection enlarged portion 22, and the connection enlarged portion 22 is merely pressed to achieve electrical conduction between the connection enlarged portion 22 and the three-dimensional component 30. Accordingly, electrical conduction can be achieved without increasing the number of members from the number of members of a conventional waveguide.

Second Embodiment

Next, a second embodiment will be described.

Figure 5:
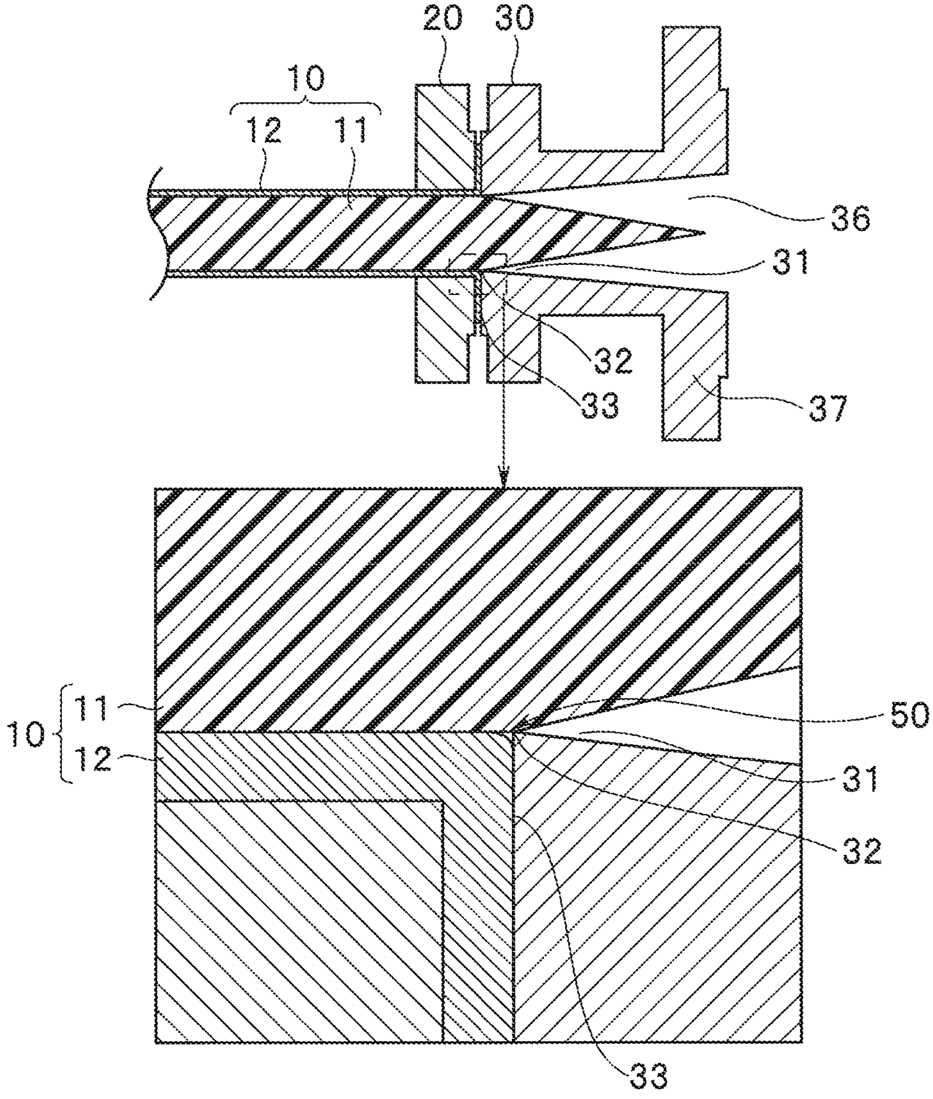
FIG. 5 is a cross-sectional view showing a cross sections of a flexible waveguide, a fixing member, and a three-dimensional component of a second embodiment in a combined state.

FIG. 5 is a cross-sectional view showing a cross sections of a flexible waveguide, a fixing member, and a three-dimensional component of the second embodiment in a combined state.

As shown in FIG. 5, an insertion hole 31 of a three-dimensional component 30 in the present embodiment has a tapered structure where the diameter increases from a surface through which the dielectric 11 is inserted toward an opening 36 on the opposite side. By setting the major axis "A" and the minor axis "B" of the insertion hole 31 on the connection surface 33 side to be substantially equal to the major axis "a" and the minor axis "b" of the dielectric 11, the flexible waveguide 10 and the three-dimensional component 30 can be easily connected with each other.

The distal end (end portion) of the dielectric 11 has a pointed shape, that is, a shape in which the cross-sectional area of the dielectric 11 gradually decreases, in the insertion hole 31 within a range from an opening of the insertion hole 31 on the corner portion 32 side to the opening 36 on the opposite side of the corner portion 32. By forming the distal end of the dielectric 11 into a pointed shape as described above, it is possible to suppress loss (reflection) of radio waves at the end portion of the dielectric 11 and hence, loss of radio waves caused by connection between the flexible waveguide 10 and the three-dimensional component 30 can be further reduced.

The shape of the distal end (end portion) of the dielectric 11 is not limited to the shape shown in FIG. 5. A shape shown in FIG. 6A, FIG. 6B, FIG. 7A, FIG. 7B, FIG. 8A, FIG. 8B, FIG. 9A, FIG. 9B, FIG. 10A, or FIG. 10B, for example, may be adopted for the distal end (end portion) of the dielectric 11. All of these shapes can significantly reduce loss of radio waves compared with the shape shown in FIG. 11A and FIG. 11B.

Figure 6A:
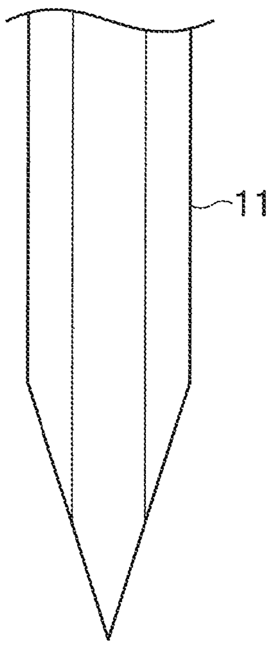
FIG. 6A is a side view showing a configuration example A of the shape of a distal end of a dielectric.
Figure 6B:
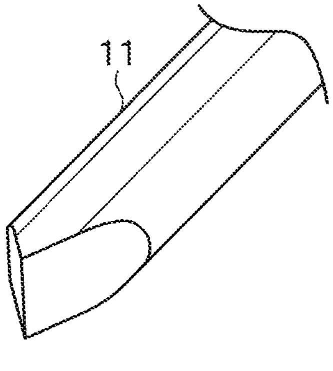
FIG. 6B is a perspective view showing the configuration example A of the shape of the distal end of the dielectric.
Figure 7A:
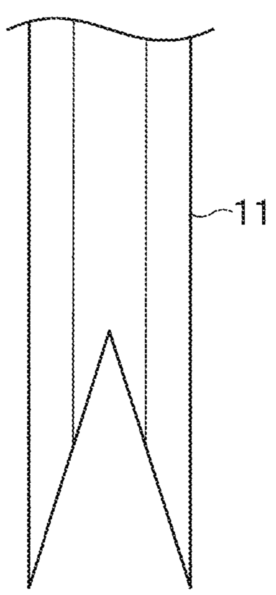
FIG. 7A is a side view showing a configuration example B of the shape of a distal end of a dielectric.
Figure 7B:
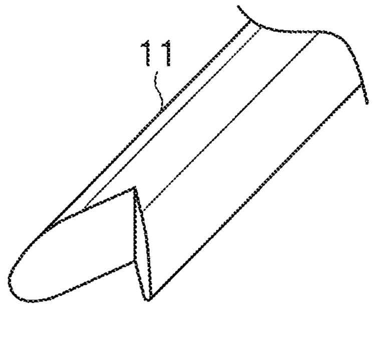
FIG. 7B is a perspective view showing the configuration example B of the shape of the distal end of the dielectric.
Figure 8A:
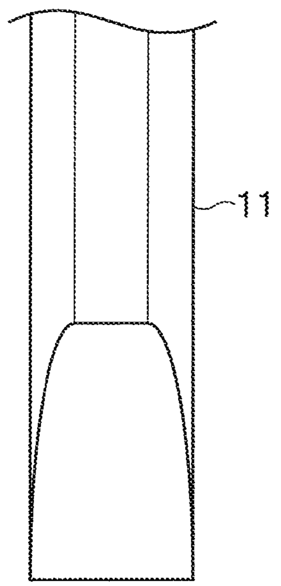
FIG. 8A is a side view showing a configuration example C of the shape of a distal end of a dielectric.
Figure 8B:
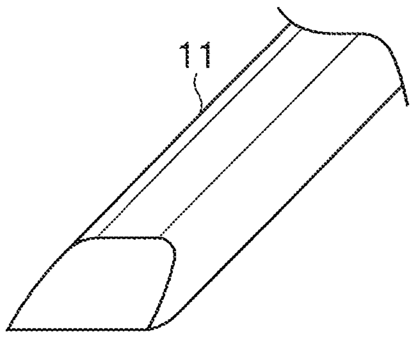
FIG. 8B is a perspective view showing the configuration example C of the shape of the distal end of the dielectric.
Figure 9A:
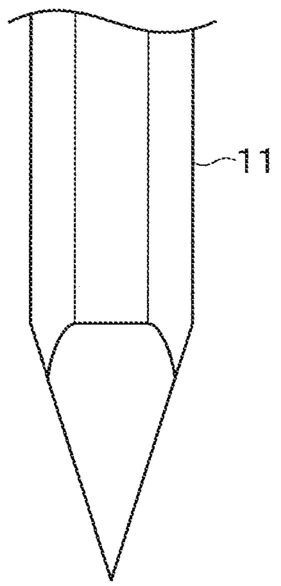
FIG. 9A is a side view showing a configuration example D of the shape of a distal end of a dielectric.
Figure 9B:
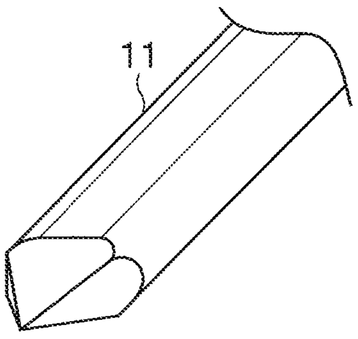
FIG. 9B is a perspective view showing the configuration example D of the shape of the distal end of the dielectric.
Figure 10A:
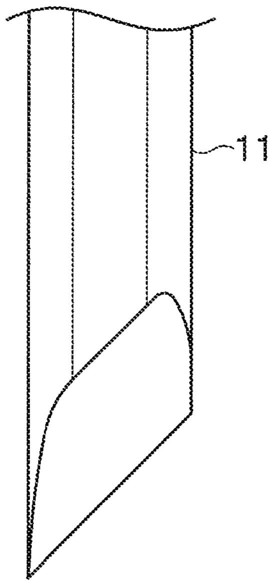
FIG. 10A is a side view showing a configuration example E of the shape of a distal end of a dielectric.
Figure 10B:
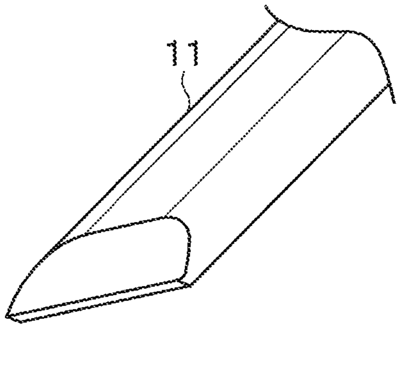
FIG. 10B is a perspective view showing the configuration example E of the shape of the distal end of the dielectric.
Figure 11A:
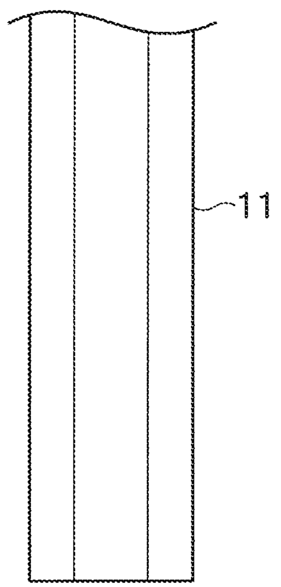
FIG. 11A is a side view showing a comparison example of the shape of a distal end of a dielectric.
Figure 11B:
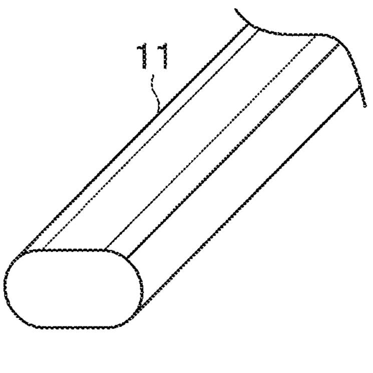
FIG. 11B is a perspective view showing the comparison example of the shape of the distal end of the dielectric.

FIG. 6A is a side view showing a configuration example A of the shape of the distal end of a dielectric, and FIG. 6B is a perspective view showing the configuration example A of the shape of the distal end of the dielectric. FIG. 7A is a side view showing a configuration example B of the shape of the distal end of a dielectric, and FIG. 7B is a perspective view showing the configuration example B of the shape of the distal end of the dielectric. FIG. 8A is a side view showing a configuration example C of the shape of the distal end of a dielectric, and FIG. 8B is a perspective view showing the configuration example C of the shape of the distal end of the dielectric. FIG. 9A is a side view showing a configuration example D of the shape of the distal end of a dielectric, and FIG. 9B is a perspective view showing the configuration example D of the shape of the distal end of the dielectric. FIG. 10A is a side view showing a configuration example E of the shape of the distal end of a dielectric, and FIG. 10B is a perspective view showing the configuration example E of the shape of the distal end of the dielectric. FIG. 11A is a side view showing a comparison example of the shape of the distal end of a dielectric, and FIG. 11B is a perspective view showing the comparison example of the shape of the distal end of the dielectric.

FIG. 12 is a view showing measurement results obtained by experimentally continuing the shapes of the distal ends of the dielectrics and amounts of reflection generated. The measurement results (magnitude of reflection) shown in FIG. 12 are obtained such that end portions of rod members made of stretched foamed PTFE and serving as the dielectrics 11 are processed into the shapes shown in the configuration example A to the configuration example E and the comparison example, and the magnitudes of reflection at the end portions of the dielectrics 11 are calculated from the measurement results (49.8 to 75.8 GHz band) obtained by the time domain using a vector network analyzer. In the measurement results shown in FIG. 12, the smaller value (the larger absolute value) indicates smaller reflection.

From such measurement results, it can be understood that the respective shapes of the configuration example A to the configuration example E significantly reduce the magnitude of reflection, that is loss of radio waves, compared with the magnitude of reflection with the shape of the comparison example. It can be also understood that reflection can be reduced particularly with the shape of the configuration example E, that is, with the shape of the distal end of the dielectric 11 where the cross-sectional area decreases from one end toward the opposite end in the direction of the major axis, and the cross-sectional area decreases from both ends of the dielectric 11 toward the center in the direction of the minor axis.

Further, the opening 36 on the opposite side of the corner portion 32 is allowed to have an opening shape connectable to a hollow waveguide. In this case, by providing a connection flange 37 on the opening 36 side, it is possible to form a waveguide connector connectable to an appropriate hollow waveguide. For example, when a flexible waveguide which can transmit a radio wave in 60 GHz band is used as the flexible waveguide 10, and the opening 36 on the opposite side of the corner portion 32 is caused to have a rectangular shape with the inner diameter dimensions having a major axis of 3.759 mm and a minor axis of 1.88 mm, the flexible waveguide 10 of the present invention can be used as a waveguide connector connectable to a hollow waveguide for 49.8 to 75.8 GHz. In the same manner, for example, when a flexible waveguide which can transmit a radio wave in 90 GHz band is used as the flexible waveguide 10, and the opening 36 on the opposite side of the corner portion 32 is caused to have a rectangular shape with the inner diameter dimensions having a major axis of 2.54 mm and a minor axis of 1.27 mm, the flexible waveguide 10 of the present embodiment can be used as a waveguide connector connectable to a hollow waveguide for 73.8 to 112 GHz. In addition to the above, when the connection flange 37 is formed into a shape generally standardized as UG-385/U, the flexible waveguide 10 can be used as a waveguide connector connectable to a standardized hollow square waveguide which is commercially available.

The dielectric 11 in the waveguide connector is not required to be bent and hence, the dielectric 11 may be hard. For example, in the case of molding the dielectric 11, the dielectric 11 of the flexible waveguide 10 is caused to extend from the through hole 21 of the fixing member 20, and cut into a shape shown in any one of the configuration example A to the configuration example E. At this point of operation, if the dielectric 11 is soft, it is difficult to mold the dielectric 11 into the shape shown in any one of the configuration example A to the configuration example E. The dielectric 11 is not required to be bent in the waveguide connector and hence, a hard dielectric has an advantage that the dielectric can be easily molded. Therefore, depending on a request to the waveguide connector, it is also possible to contemplate the case where the hard dielectric 11 in the waveguide connector is more preferable.

In the case of the configuration shown in FIG. 5, there is a possibility that a slight recess is formed at a connection portion 50 between the outer conductor 12 and the connection surface 3. Such a slight recess becomes a cause of the generation of loss (reflection) of radio waves. In view of the above, the flexible waveguide, the fixing member, and the three-dimensional component may have the configuration shown in FIG. 13.

(Modification)

Figure 13:
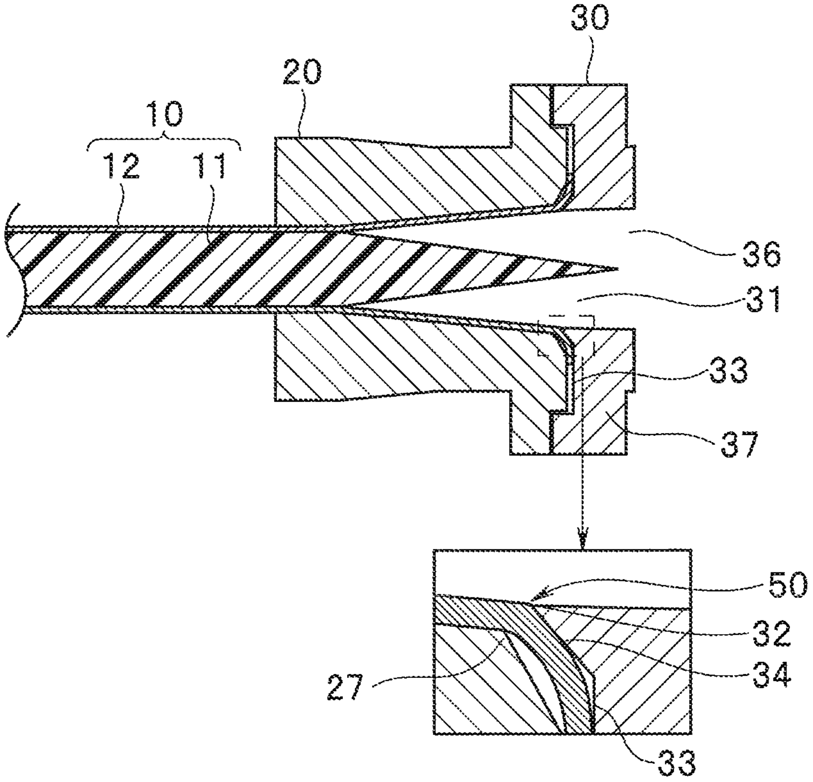
FIG. 13 is a cross-sectional view showing a cross section of a flexible waveguide, a fixing member, and a three-dimensional component according to a modification of the second embodiment in a combined state.

FIG. 13 is a cross-sectional view showing the cross sections of a flexible waveguide, a fixing member, and a three-dimensional component according to a modification of the second embodiment in a combined state.

As shown in FIG. 13, an insertion hole 31 of a three-dimensional component 30 has a hole shape with a major axis and a minor axis which are greater than the major axis "a" and the minor axis "b" of the cross section of the dielectric 11, and a connection surface 33 has an edge portion 34 which protrudes toward the front side. A through hole 21 of a fixing member 20 has a portion having a smallest hole diameter with the major axis "C" and the minor axis "D" at a position away from the side end, which comes into contact with the three-dimensional component 30, and the through hole 21 also has a presser 27 to smoothly connect the outer conductor 12 to the edge portion 34. The outer conductor 12 of the flexible waveguide 10 inserted into the through hole 21 has a tapered shape in which the diameter is smoothly increased while the braid structure of the outer conductor 12 is maintained, and the outer conductor 12 is connected to the edge portion 34 of the three-dimensional component 30.

With such a configuration, the end portion of the outer conductor 12 is connected to the edge portion 34 of the three-dimensional component 30 while being smoothly bent to curve along the edge portion 34 of the three-dimensional component 30. Therefore, in this structure, a recess is not easily formed at the connection portion 50 between the end portion of the outer conductor 12 and the three-dimensional component 30 and hence, loss (reflection) of radio waves can be suppressed.

The distal end (end portion) of the dielectric 11 has a pointed shape in the same manner as the shape shown in FIG. 5. In the modification, in the insertion hole 31 and the through hole 21, the distal end (end portion) of the dielectric 11 has a shape in which the cross-sectional area of the dielectric 11 gradually decreases, within a range starting from the portion having the smallest diameter in the through hole 21 to the opening 36 of the insertion hole 31 on the opposite side of the corner portion 32. Also in the modification, as shown in the embodiment shown in FIG. 5, by forming the distal end of the dielectric 11 into a pointed shape, it is possible to suppress loss (reflection) of radio waves at the end portion of the dielectric 11 and hence, loss of radio waves caused by connection can be further reduced.

Third Embodiment

Next, a third embodiment will be described.

In the third embodiment, the description will be made with respect to a waveguide connector for connecting the flexible waveguide 10 to another device, such as a measuring instrument.

Figure 14A:
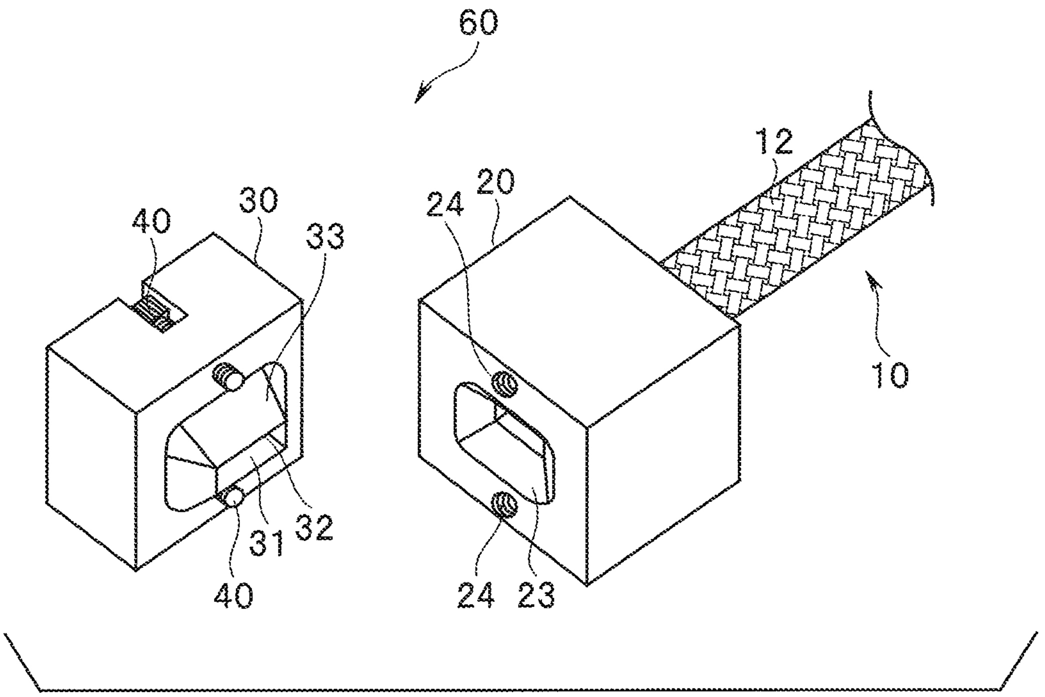
FIG. 14A is an external appearance view showing external appearances of a flexible waveguide, a fixing member, a three-dimensional component, and auxiliary pressing members, and showing a state where an end portion of the flexible waveguide is combined with the fixing member.
Figure 14B:
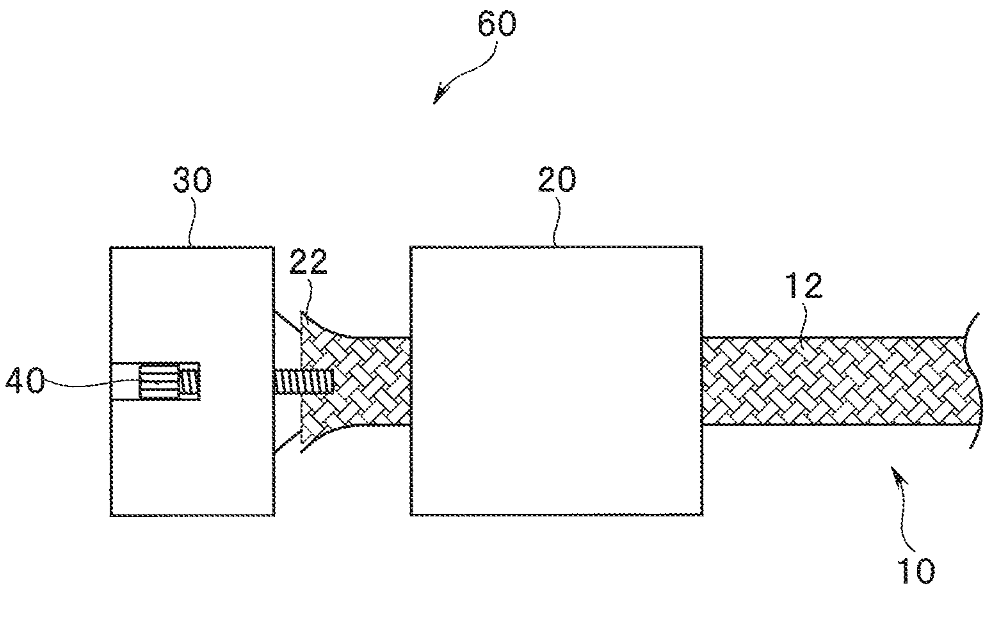
FIG. 14B is an external appearance view showing a state before the fixing member is combined with the three-dimensional component.

FIG. 14A is an external appearance view showing external appearances of a flexible waveguide, a fixing member, a three-dimensional component, and auxiliary pressing members, and showing a state where the end portion of the flexible waveguide is combined with the fixing member. FIG. 14B is an external appearance view showing a state before the fixing member is combined with the three-dimensional component.

As shown in FIG. 14A and FIG. 14B, a waveguide connector 60 of the present embodiment is configured of a flexible waveguide 10, a fixing member 20, a three-dimensional component 30, and auxiliary pressing members 40. A connection surface 33 of the three-dimensional component 30 has a tapered structure where the connection surface 33 protrudes toward the fixing member 20 when the connection surface 33 is connected to the fixing member 20. The distal end surface of the fixing member 20 has a connection surface 23 having a tapered structure where the connection surface 23 is recessed so as to allow the connection surface 33 of the three-dimensional component 30 to come into contact with the connection surface 23.

The three-dimensional component 30 is provided with the auxiliary pressing members 40 configured of two male screws. The distal end surface of the fixing member 20 is provided with two female screws 24 at positions which face the two male screws when the dielectric 11 is inserted into the insertion hole 31 of the three-dimensional component 30, the two male screws being the auxiliary pressing members 40 provided to the three-dimensional component 30. The male screws, which are the auxiliary pressing members 40 provided to the three-dimensional component 30, are screwed into the female screws 24 provided to the fixing member 20 to press the fixing member 20 and the three-dimensional component 30 together.

In the present embodiment, with the provision of the connection surface 33 having the tapered structure, the connection enlarged portion 22, which is the end portion of the outer conductor 12, can be expanded more smoothly compared with the first embodiment. Therefore, a stepped portion is not easily formed at the connection portion between the fixing member 20 and the three-dimensional component 30 compared with the first embodiment.

Accordingly, the waveguide connector of the present embodiment has an advantageous effect substantially equal to the advantageous effect of the first embodiment, and the connection enlarged portion 22 expands more smoothly compared with the first embodiment and hence, a stepped portion is not easily formed at the connection portion between the fixing member 20 and the three-dimensional component 30 whereby the generation of loss of radio waves can be further suppressed compared with the first embodiment.

Fourth Embodiment

Next, a fourth embodiment will be described.

Figure 15A:
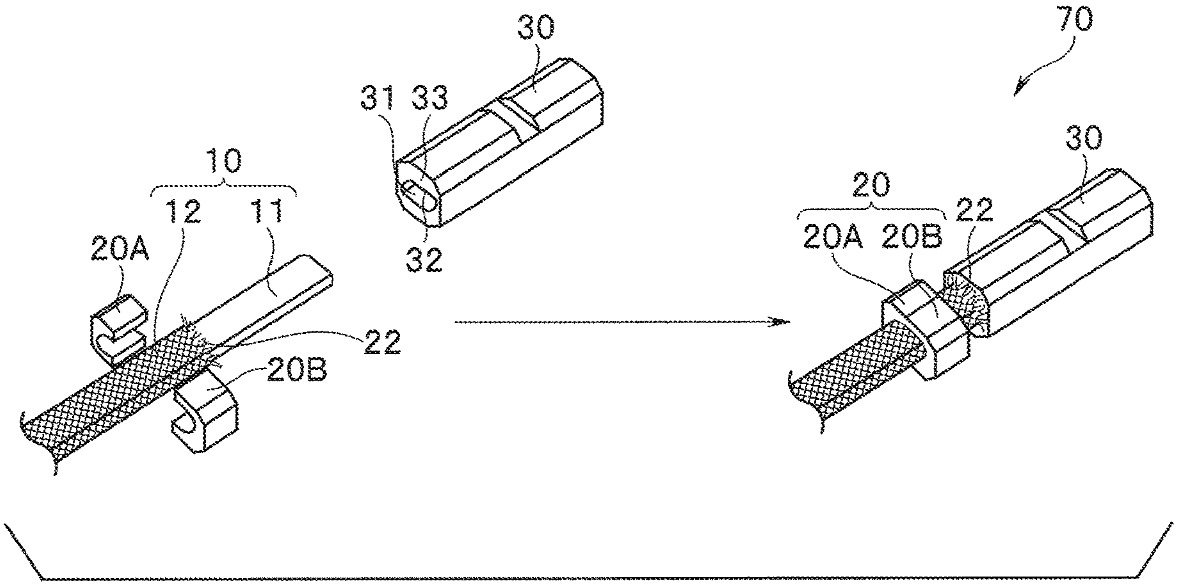
FIG. 15A is an external appearance view showing external appearances of a flexible waveguide, a fixing member, and a three-dimensional component, and showing a state where an end portion of the flexible waveguide, the fixing member, and the three-dimensional component are combined with each other.
Figure 15B:
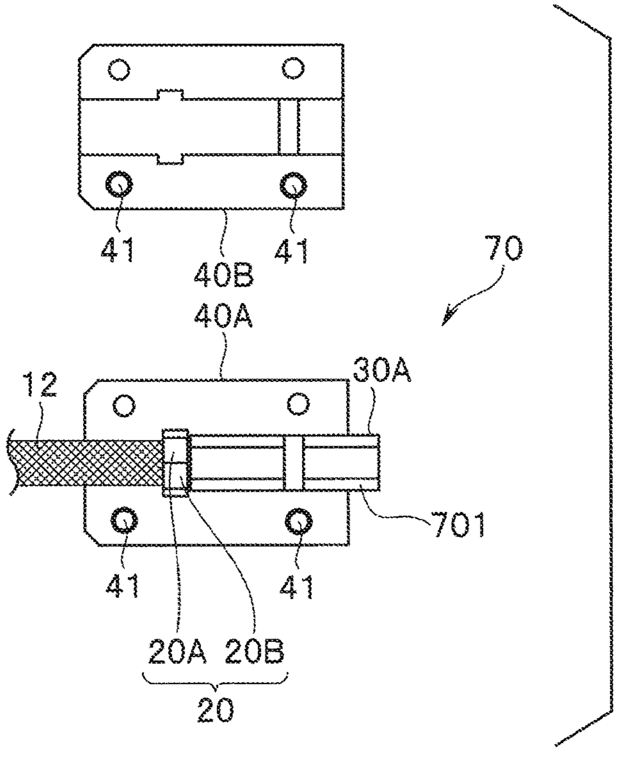
FIG. 15B is an external appearance view showing the external appearances of the flexible waveguide, the fixing member, the three-dimensional component, and an auxiliary pressing member.
Figure 15C:
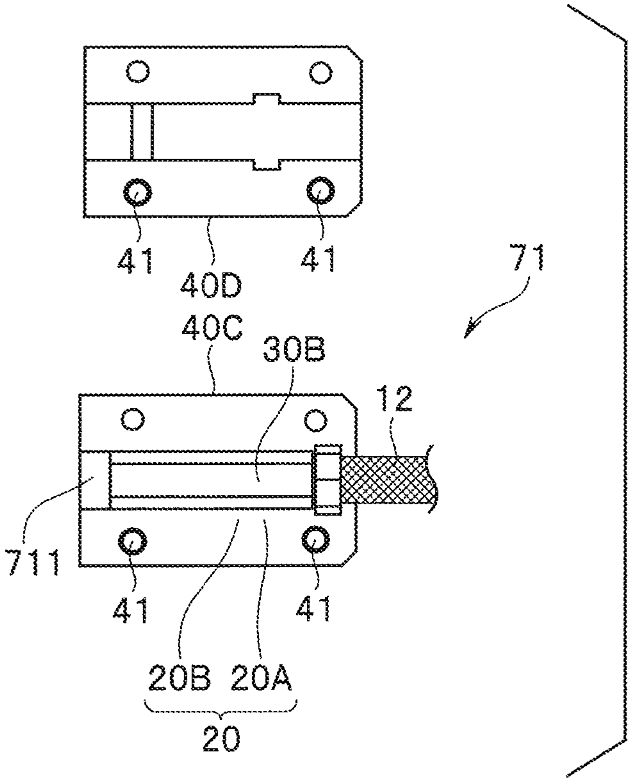
FIG. 15C is an external appearance view showing the external appearances of the flexible waveguide, the fixing member, the three-dimensional component, and the auxiliary pressing member.

FIG. 15A is an external appearance view showing external appearances of a flexible waveguide, a fixing member, and a three-dimensional component, and showing a state where the end portion of the flexible waveguide, the fixing member, and the three-dimensional component are combined with each other. FIG. 15B and FIG. 15C are external appearance views showing the external appearances of the flexible waveguide, the fixing member, the three-dimensional component, and an auxiliary pressing member.

As shown in FIG. 15A, FIG. 15B and FIG. 15C, a waveguide connector 70 of the present embodiment is configured of a flexible waveguide 10, a fixing member 20, a three-dimensional component 30, and an auxiliary pressing member 40. The fixing member 20 in the present embodiment is configured of a plurality of fixing members, in the present embodiment, is configured of two divided fixing members 20A and 20B. The fixing member 20 is configured of the two fixing members 20A and 20B. However, the fixing member 20 may be configured of three or more fixing members. The auxiliary pressing member 40 is configured of a plurality of auxiliary pressing members, in the present embodiment, is configured of two divided auxiliary pressing members 40A and 40B.

In the above-mentioned respective embodiments, it is necessary to insert in advance the flexible waveguide 10 into the through hole 21 of the fixing member 20 at the time of assembly. The major axis "C" of the through hole 21 is substantially equal to a length obtained by adding the value of two times the thickness "d" of the outer conductor 12 to the major axis "a" of the dielectric 11, and the minor axis "D" of the through hole 21 is substantially equal to a length obtained by adding the value of two times the thickness "d" of the outer conductor 12 to the minor axis "b" of the dielectric 11. Therefore, it may take time and effort to insert the flexible waveguide 10 into the through hole 21 of the fixing member 20 at the time of assembly.

In contrast, in the present embodiment, one fixing member 20 can be formed by sandwiching the flexible waveguide 10 between the two fixing members 20A and 20B at the time of assembly and hence, ease of assembly is significantly improved.

In the present embodiment, the auxiliary pressing members 40A and 40B are fixed by screw members 41 in a state of enclosing the three-dimensional component 30 and the fixing member 20, and the auxiliary pressing members 40A and 40B apply, due to elasticity of the auxiliary pressing members 40A and 40B, a force of sandwiching a connection enlarged portion 22 between the fixing member 20 and a connection surface 33 of the three-dimensional component 30. As a result, the waveguide connector of the present embodiment can freely adopt a small shape.

As a result, the waveguide connector of the present embodiment has an advantageous effect substantially equal to the advantageous effect of the first embodiment, and can achieve improvement in ease of assembly and ease of miniaturization.

The waveguide connector 70 of the present embodiment forms a pair with a waveguide connector 71 shown in FIG. 15C, and the waveguide connector 70 and the waveguide connector 71 are used in combination. The waveguide connector 71 has a structure substantially equal to the structure of the waveguide connector 70. However, the waveguide connector 71 differs from the waveguide connector 70 with respect to a point that the waveguide connector 70 includes a protruding portion 701 formed by causing a three-dimensional component 30A to protrude, but the waveguide connector 71 includes an insertion portion 711 formed by causing a three-dimensional component 30B to be retracted inwardly. In other words, when the protruding portion 701 of the waveguide connector 70 is inserted into the insertion portion 711 of the waveguide connector 71, the three-dimensional component 30A of the waveguide connector 70 and the three-dimensional component 30B of the waveguide connector 71 can be connected with each other without causing positional deviation.

An insertion hole 31 of the three-dimensional component 30A of the waveguide connector 70 and an insertion hole 31 of the three-dimensional component 30B of the waveguide connector 71 are through holes each of which is processed to have a cross-sectional shape substantially equal to the outer shape of the dielectric 11. The insertion holes 31 are designed such that hole positions of the insertion holes 31 are aligned with each other when the protruding portion 701 of the waveguide connector 70 is inserted into the insertion portion 711 of the waveguide connector 71 with the protruding portion 701 and the insertion portion 711 aligned. The dielectric 11 is inserted into each insertion hole 31 without forming a gap in the insertion hole 31.

At this point of operation, each of the insertion hole 31 of the three-dimensional component 30A and the insertion hole 31 of the three-dimensional component 30B serves as a waveguide, and the insertion holes 31 come into contact with the dielectrics 11 without causing positional deviation and without forming a gap and hence, there is no possibility of the generation of loss of radio waves also at the insertion holes 31. In other words, the waveguide connectors 70, 71 of the present embodiment connect the flexible waveguides together, thus effectively functioning as waveguide connectors.

Fifth Embodiment

Next, a fifth embodiment will be described.

In the fifth embodiment, a connection structure for connecting the flexible waveguide 10 to a mode converter will be described.

Figure 16:
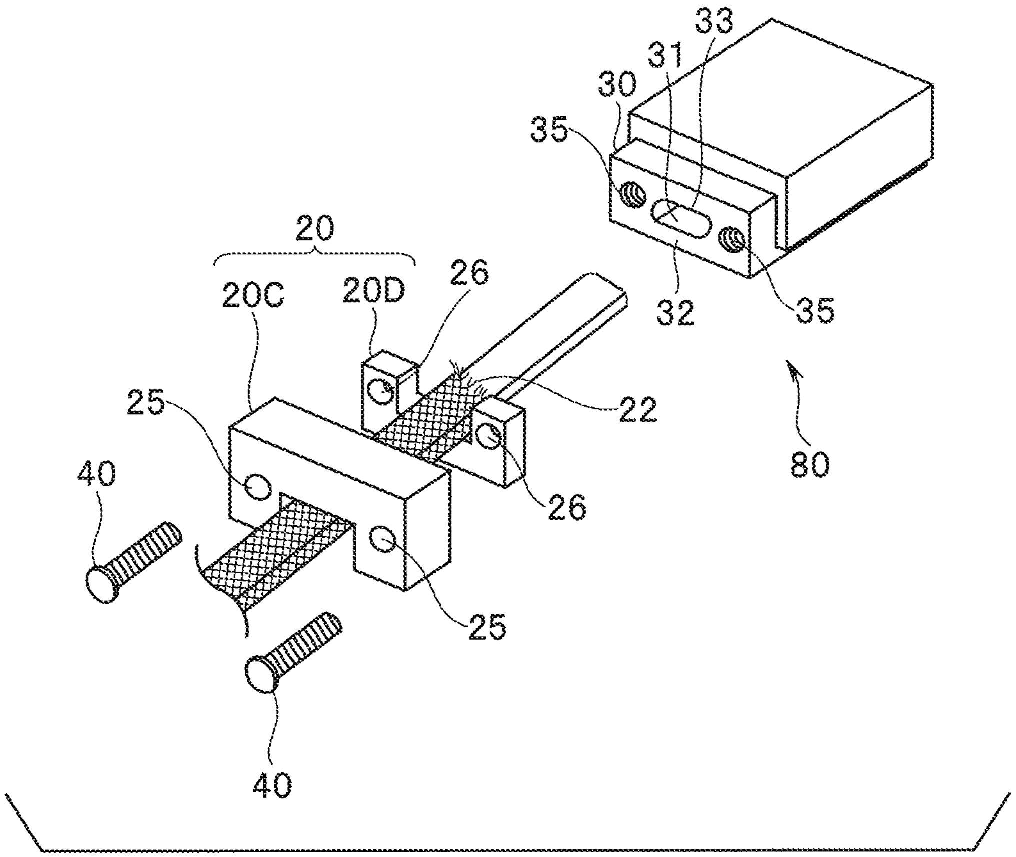
FIG. 16 is an external appearance view showing the external appearances of a flexible waveguide, a fixing member, a three-dimensional component, and auxiliary pressing members.

FIG. 16 is an external appearance view showing the external appearances of a flexible waveguide, a fixing member, a three-dimensional component, and auxiliary pressing members.

As shown in FIG. 16, a mode converter 80 of the present embodiment is configured of a flexible waveguide 10, a fixing member 20, a three-dimensional component 30, and auxiliary pressing members 40. In the same manner as the fourth embodiment, the fixing member 20 of the present embodiment is configured of a plurality of fixing members, in the present embodiment, is configured of two divided fixing members 20C and 20D. The fixing member 20 is configured of the two fixing members 20C and 20D. However, the fixing member 20 may be configured of three or more fixing members.

The fixing member 20C has through holes 25, and the fixing member 20D has through holes 26. Male screws forming the auxiliary pressing members 40 penetrate through the through holes 25, 26, and are screwed and fixed into female screws 35 of the three-dimensional component 30, so that the two fixing members 20C and 20D are coupled with each other to form the fixing member 20.

The male screws forming the auxiliary pressing members 40 are screwed into the female screws 35, so that a connection enlarged portion 22 is sandwiched and fixed between the fixing member 20 and a connection surface 33 of the three-dimensional component 30.

As a result, the mode converter of the present embodiment has an advantageous effect substantially equal to the advantageous effect of the first embodiment, and can achieve improvement in ease of assembly and ease of miniaturization.

Sixth Embodiment

Next, a sixth embodiment will be described.

In the sixth embodiment, a waveguide unit where a waveguide connector is disposed at each of both ends of a flexible waveguide 10 will be described.

Figure 17:
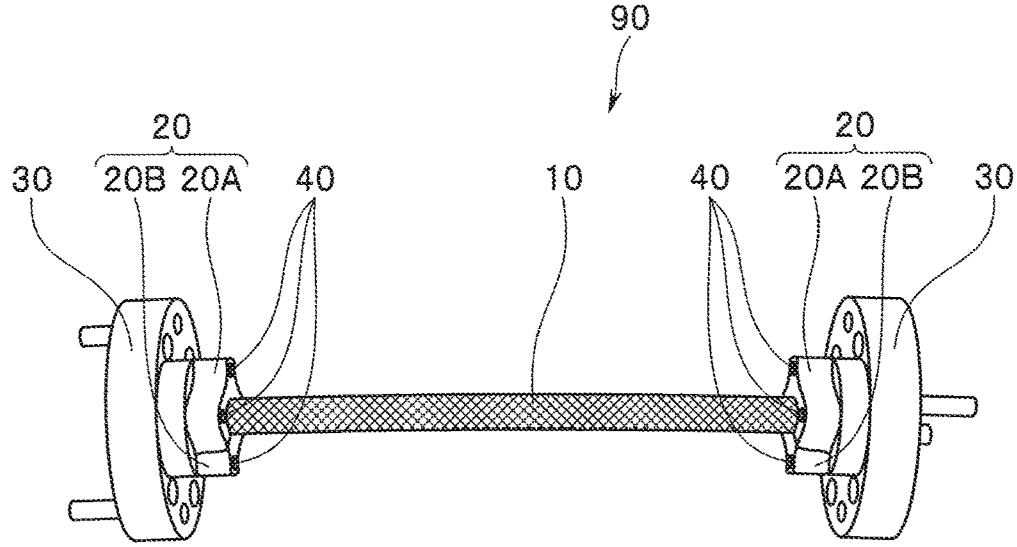
FIG. 17 is an external appearance view showing external appearances of a waveguide unit configured of a flexible waveguide, fixing members, three-dimensional components, and auxiliary pressing member.

FIG. 17 is an external appearance view showing external appearances of the waveguide unit configured of a flexible waveguide, fixing members, three-dimensional components, and auxiliary pressing members.

As shown in FIG. 17, a waveguide unit 90 of the present embodiment is configured of waveguide connectors each of which includes a flexible waveguide 10, a fixing member 20, a three-dimensional component 30, and auxiliary pressing members 40, the fixing member 20, the three-dimensional component 30 and the auxiliary pressing members 40 being disposed at each of both ends of the flexible waveguide 10. Each of the waveguide connectors of the present embodiment has the connection structure of the second embodiment, and an insertion hole 31 of the three-dimensional component 30 has a tapered structure where a diameter increases from a surface through which a dielectric 11 is inserted toward an opening on the opposite side. Further, the distal end (end portion) of the dielectric 11 has a pointed shape, that is, a shape in which the cross-sectional area of the dielectric 11 gradually decreases, in the insertion hole 31 within a range from the opening of the insertion hole on the corner portion 32 side to an opening 36 on the opposite side of the corner portion 32.

The flexible waveguide 10 has a characteristic of being capable of transmitting a radio wave in 60 GHz hand. The three-dimensional component 30 includes the opening 36 and a connection flange 37, the opening 36 having a rectangular shape with a major axis of 3.759 mm and a minor axis of 1.88 mm, the connection flange 37 having a shape generally standardized as UG-385/U.

Therefore, the waveguide unit 90 of the present embodiment can be used in the same manner as a hollow square waveguide which is standardized and is commercially available.

Figure 18A:
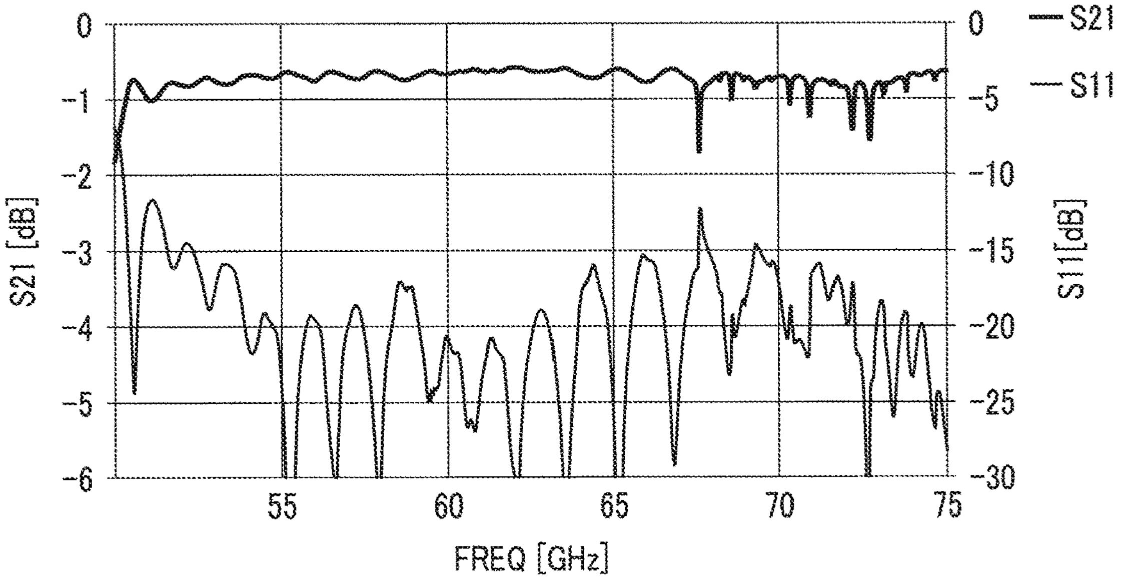
FIG. 18A is a graph showing an example of transmission characteristic measurement values of a waveguide unit when the shape of the configuration example A is adopted for the distal end of the dielectric.
Figure 18B:
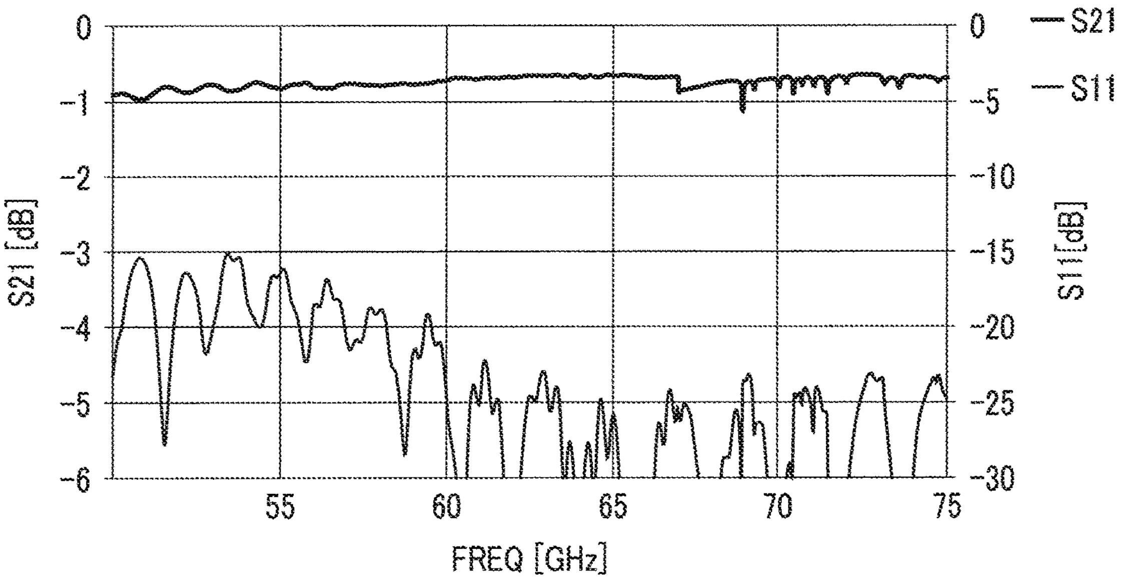
FIG. 18B is a graph showing an example of transmission characteristic measurement values of a waveguide unit when the shape of the configuration example E is adopted for the distal end of the dielectric.
Figure 18C:
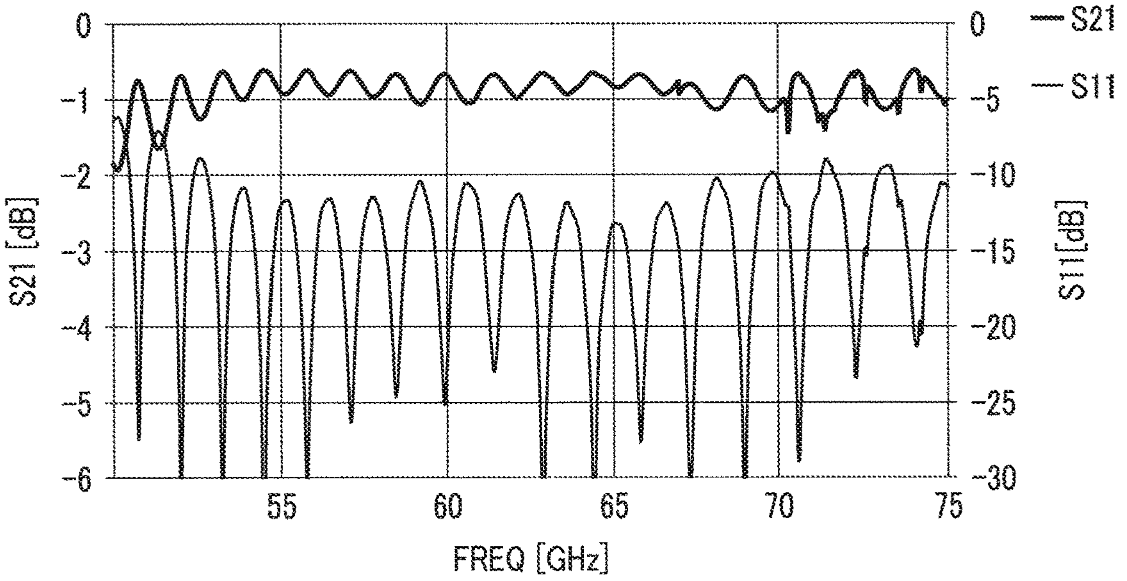
FIG. 18C is a graph showing an example of transmission characteristic measurement values of a waveguide unit when the shape of the comparison example is adopted for the distal end of the dielectric.

Examples of transmission characteristic measurement values of the waveguide unit 90 of the present embodiment are shown in FIG. 18A, FIG. 189, and FIG. 18C. FIG. 18A is a graph showing an example of transmission characteristic measurement values of a waveguide unit when the shape of the configuration example A is adopted for the distal end of the dielectric. FIG. 18B is a graph showing an example of transmission characteristic measurement values of a waveguide unit when the shape of the configuration example E is adopted for the distal end of the dielectric. FIG. 18C is a graph showing an example of transmission characteristic measurement values of a waveguide unit when the shape of comparison example is adopted for the distal end of the dielectric.

In the case where the shape of the configuration example A shown in FIG. 6A and FIG. 69 is adopted as the shape of both ends of the dielectric 11, as shown in FIG. 18A, a reflection characteristic (S11) is approximately −20 dB, and wave in a transmission characteristic (S21) caused by reflection at the connector portion is sufficiently small. Accordingly, such a configuration can achieve a practical waveguide.

In the case where the shape of the configuration example E shown in FIG. 10A and FIG. 10B is adopted as the shape of both ends of the dielectric 11, as shown in FIG. 18B, a reflection characteristic (S11) is less than −20 dB, and wave in a transmission characteristic (S21) caused by reflection at the connector portion is further small. Accordingly, such a configuration can achieve a more practical waveguide.

In contrast, in the case where the shape of the comparison example shown in FIG. 11A and FIG. 11B is adopted as the shape of both ends of the dielectric 11, as shown in FIG. 18C, a reflection characteristic (S11) reaches approximately −10 dB, and wave in a transmission characteristic (S21) caused by reflection at the connector portion is large. Such characteristics are not practical for a waveguide.

In the above-mentioned respective embodiments, the flexible waveguide 10 includes the dielectric 11 having a flat cross section, and the outer conductor 12 formed around the dielectric 11 and having a braid shape, and the flexible waveguide 10 can obtain a realistic structure for connecting the flexible waveguide 10 to another member while achieving both a small loss of radio waves (reflection and leakage of radio waves) and ease in connection. Another member may be a conventional waveguide, a tapered waveguide where the diameter of the waveguide varies, a waveguide connector, a mode converter, or the like.

With the connection structure of the waveguide, the waveguide connector, the mode converter, and the waveguide unit of the present invention, it is possible to prevent loss of radio waves when the waveguide including the outer conductor having the braid-shape structure is connected to another member.

The present invention is not limited to the above-mentioned embodiments, and various changes, modifications, and the like are conceivable without departing from the gist of the present invention.

What is claimed is:

1. A connection structure of a waveguide, the connection structure connecting a waveguide used for transmitting a radio wave of a millimeter wave frequency or a frequency higher than the millimeter wave frequency, to another member, wherein the waveguide includes a rod-like dielectric, and an outer conductor formed by braiding a plurality of flat foil yarns into a braid shape around the rod-like dielectric, the plurality of flat foil yarns having conductivity, a three-dimensional component, which is the other member, includes a connection surface at least partially including a conductive region to which a connection enlarged portion of the outer conductor is connected in a state where the three-dimensional component is connected with the waveguide, an insertion hole which is open on the connection surface, and has conductivity over an entire circumference of an inner surface, a portion of the rod-like dielectric exposed at the connection enlarged portion of the waveguide being inserted into the insertion hole in the state where the three-dimensional component is connected with the waveguide, and a corner which forms an opening edge of the insertion hole over an entire circumference on the connection surface, the corner having conductivity and being conducted with the inner surface of the insertion hole, and in a state where the waveguide and the other member are connected with each other, the connection enlarged portion is electrically conducted with the inner surface of the insertion hole through electrical connection with the connection surface and the corner, and smooth connection is made at the corner.

2. The connection structure of a waveguide according to claim 1, wherein at the corner, a waveguide path formed by an inner surface of the outer conductor of the waveguide and a waveguide path formed by the inner surface of the insertion hole are continuously connected to be aligned within an error range of 1/50 of a center wavelength $\lambda$ of a carrier wave.

3. The connection structure of a waveguide according to claim 1, wherein the connection surface of the three-dimensional component includes an edge which protrudes toward a front side, and the outer conductor is smoothly expanded along the edge.

4. The connection structure of a waveguide according to claim 1, wherein the connection enlarged portion and the connection surface of the three-dimensional component are electrically conducted with each other by a conductive adhesive agent.

5. The connection structure of a waveguide according to claim 1, wherein the three-dimensional component is a molded interconnect device.

6. A waveguide connector which has the connection structure of the waveguide according to claim 1.

7. A mode converter which has the connection structure of the waveguide according to claim 1.

8. The connection structure of a waveguide according to claim 1, the connection structure further comprising:

a fixing member configured to fix the waveguide to the three-dimensional component; and an auxiliary pressing member configured to press the fixing member and the three-dimensional component together, wherein the fixing member includes a through hole, and the through hole has a flattened cross-sectional hole shape at a portion having a smallest hole diameter, the flattened cross-sectional hole shape having a major axis greater than a major axis of a cross section of the rod-like dielectric by a length of two times a thickness of the outer conductor, and having a minor axis greater than a minor axis of the cross section of the rod-like dielectric by the length of two times the thickness of the outer conductor, and in a state where the waveguide is inserted into the through hole and the rod-like dielectric is inserted into the insertion hole, the fixing member presses the connection enlarged portion against the connection surface by the auxiliary pressing member to make the connection enlarged portion electrically conductive with the connection surface from the corner.

9. The connection structure of a waveguide according to claim 8, wherein the fixing member is configured of a plurality of members, and the through hole is formed by combining the plurality of members.

10. The connection structure of a waveguide according to claim 8, wherein the insertion hole of the three-dimensional component has a flat cross-sectional shape having a major axis and a minor axis which are greater than the major axis and the minor axis of the cross section of the rod-like dielectric, and the through hole, which is flattened and formed in the fixing member, includes the portion having the smallest hole diameter at a position away from a side end which comes into contact with the three-dimensional component, and the outer conductor of the waveguide inserted into the through hole is expanded toward the corner of the three-dimensional component from the portion having the smallest hole diameter in the through hole of the fixing member.

11. A waveguide connector which is connectable to a hollow square waveguide, wherein the waveguide connector has the connection structure of the waveguide according to claim 10, an opening of the insertion hole of the three-dimensional component on an opposite side of the corner has an opening shape connectable to a hollow waveguide, and the rod-like dielectric has a shape in which a cross-sectional area of the rod-like dielectric gradually decreases, in the insertion hole and the through hole within a range starting from the portion having the smallest diameter in the through hole to the opening of the insertion hole on an opposite side of the corner.

12. The connection structure of a waveguide according to claim 8, wherein the insertion hole of the three-dimensional component has a flat cross-sectional shape at least at an end on a side of the corner, the flat cross-sectional shape having a major axis and a minor axis substantially equal to the major axis and the minor axis of the cross section of the rod-like dielectric, and the through hole of the fixing member includes the portion having the smallest diameter at least at a side end which comes into contact with the three-dimensional component.

13. A waveguide connector which is connectable to a hollow square waveguide, wherein the waveguide connector has the connection structure of the waveguide according to claim 12, the insertion hole is formed in the three-dimensional component, an opening of the insertion hole on an opposite side of the corner has an opening shape connectable to a hollow waveguide, and the rod-like dielectric has a shape in which a cross-sectional area of the rod-like dielectric gradually decreases, in the insertion hole within a range starting from the corner of the insertion hole to the opening on the opposite side of the corner.

14. The waveguide connector according to claim 13, wherein the shape in which the cross-sectional area of the rod-like dielectric gradually decreases, is a shape in which the cross-sectional area decreases from one end toward an opposite end in a direction of a major axis, and the cross-sectional area decreases from both ends of the rod-like dielectric toward a center in a direction of a minor axis.

15. A waveguide unit comprising:

the waveguide; and the waveguide connector connectable to the hollow square waveguide according to claim 13, the waveguide including the rod-like dielectric having a flat cross-sectional shape and the outer conductor formed by braiding the plurality of flat foil yarns into the braid shape around the rod-like dielectric in a longitudinal direction, the plurality of flat foil yarns having conductivity, the waveguide connector being disposed at each of both ends of the waveguide.

* * * * *